(12) United States Patent
Goswami et al.

(10) Patent No.: US 10,690,121 B2
(45) Date of Patent: Jun. 23, 2020

(54) INTEGRATED CASCADING CYCLE SOLAR THERMAL PLANTS

(71) Applicants: Dharendra Yogi Goswami, Tampa, FL (US); Elias K. Stefanakos, Tampa, FL (US); Nitin Goel, Ghaziabad (IN)

(72) Inventors: Dharendra Yogi Goswami, Tampa, FL (US); Elias K. Stefanakos, Tampa, FL (US); Nitin Goel, Ghaziabad (IN)

(73) Assignee: University of South Florida, Tampa, FL (US)

( * ) Notice: Subject to any disclaimer, the term of this patent is extended or adjusted under 35 U.S.C. 154(b) by 1575 days.

(21) Appl. No.: 13/665,270

(22) Filed: Oct. 31, 2012

(65) Prior Publication Data

US 2013/0104546 A1    May 2, 2013

Related U.S. Application Data

(60) Provisional application No. 61/553,580, filed on Oct. 31, 2011.

(51) Int. Cl.
| | |
|---|---|
| F03G 6/00 | (2006.01) |
| F03G 6/06 | (2006.01) |
| F01K 25/08 | (2006.01) |
| F01K 23/04 | (2006.01) |
| F01K 23/02 | (2006.01) |
| F24S 80/30 | (2018.01) |
| F24S 20/20 | (2018.01) |

(52) U.S. Cl.
CPC ............. *F03G 6/00* (2013.01); *F01K 23/02* (2013.01); *F01K 23/04* (2013.01); *F01K 25/08* (2013.01); *F03G 6/06* (2013.01); *F03G 6/065* (2013.01); *F24S 20/20* (2018.05); *F24S 80/30* (2018.05); *Y02E 10/46* (2013.01)

(58) Field of Classification Search
CPC ... F01K 3/008; F01K 3/12; F01K 3/16; F01K 25/00; F02C 1/04; F02C 6/14; F03G 3/00; F03G 5/00; F03G 6/00–068; F03G 6/065; F03G 7/00; F03G 2730/06; F03G 2006/006; F03G 2006/008; F03G 2006/061; F03G 2006/062; F22B 1/006; G01K 5/32; G01K 5/44; G05D 23/12; G05D 23/126; Y02E 10/46
USPC .......... 60/206, 523, 530–531, 641.8–641.15, 60/643, 650, 659, 669, 670, 682, 655; 122/7 R, 27, 28, 442, 461, 506, 509; 126/634, 635, 640, 683, 684, 688–695, 126/698–700, 704, 561–713; 165/9.1; 290/1 A
See application file for complete search history.

(56) References Cited

U.S. PATENT DOCUMENTS 3,152,442 A * 10/1964 Rowekamp ................. F24J 2/06
  126/641
3,795,103 A *  3/1974 Anderson ................. F01K 3/185
  60/651

(Continued)

FOREIGN PATENT DOCUMENTS

WO   WO-2009045117 A2 *  4/2009  ............ F01K 25/08
WO   WO 2011119413 A2 *  9/2011  ............. F03G 7/04

*Primary Examiner* — Laert Dounis
(74) *Attorney, Agent, or Firm* — Thomas | Horstemeyer, LLP

(57) ABSTRACT

In one embodiment, a thermodynamic system includes multiple types of thermodynamic cycles and multiple types of solar thermal fields that provide thermal energy to the thermodynamic cycles.

12 Claims, 4 Drawing Sheets

(56) References Cited

U.S. PATENT DOCUMENTS

| | | | | |
|---|---|---|---|---|
| 4,010,732 A * | 3/1977 | Sawata | ............... | F24J 2/055 |
| | | | | 126/646 |
| 4,164,123 A * | 8/1979 | Smith | ............... | F03G 6/065 |
| | | | | 126/684 |
| 4,265,223 A * | 5/1981 | Miserlis | ............... | F22B 1/006 |
| | | | | 126/592 |
| 4,449,517 A * | 5/1984 | Tani | ............... | F24D 11/003 |
| | | | | 126/583 |
| 4,573,321 A * | 3/1986 | Knaebel | ............... | F01K 25/065 |
| | | | | 60/649 |
| 4,578,953 A * | 4/1986 | Krieger | ............... | F01K 3/185 |
| | | | | 60/655 |
| 2006/0225428 A1* | 10/2006 | Brostmeyer | ............... | F01K 23/103 |
| | | | | 60/772 |
| 2008/0127647 A1* | 6/2008 | Leitner | ............... | F02C 1/007 |
| | | | | 60/645 |
| 2008/0168772 A1* | 7/2008 | Radcliff | ............... | F01K 25/08 |
| | | | | 60/651 |
| 2009/0121495 A1* | 5/2009 | Mills | ............... | F01K 3/12 |
| | | | | 60/641.15 |
| 2010/0319346 A1* | 12/2010 | Ast | ............... | F01K 23/04 |
| | | | | 60/616 |
| 2011/0209474 A1* | 9/2011 | Leibowitz | ............... | F01K 23/04 |
| | | | | 60/641.1 |
| 2012/0240577 A1* | 9/2012 | Mandelberg | ............... | F03G 6/067 |
| | | | | 60/641.15 |
| 2012/0274069 A1* | 11/2012 | Venetos | ............... | F03G 6/067 |
| | | | | 290/52 |
| 2013/0168972 A1* | 7/2013 | Xu | ............... | F01K 23/04 |
| | | | | 290/1 R |

* cited by examiner

INTEGRATED CASCADING CYCLE SOLAR THERMAL PLANTS

CROSS-REFERENCE TO RELATED APPLICATION

This application claims priority to U.S. provisional application entitled, "Integrated Cascading Cycle Solar Thermal Plants," having Ser. No. 61/553,580 filed Oct. 31, 2011, which is entirely incorporated herein by reference.

BACKGROUND

Interest in solar thermal power has risen in recent years. Concentrating solar power (CSP) is the lowest cost solar power technology at utility scale. However, the costs are still too high to be competitive without government support. Reducing the capital costs by about 50% will make CSP competitive with conventional resources without government incentives.

Some of the reductions in cost will come from economy of scale and minor design innovations. However, additional cost reductions will have to come from improvements in the power conversion efficiencies. In a 100 megawatt (MW) CSP plant, each 1% improvement in the overall plant efficiency can result in a reduction of approximately $20 million in capital costs at current prices. The overall efficiency of a CSP plant is the product of the efficiencies of the solar field and the power block. Therefore, it is important to look at the potential improvements in the efficiencies of both the solar field and the power block. The solar field efficiency depends on the efficiency of the solar collectors being used in the field, while the efficiency of the power block depends on the efficiencies of the thermodynamic cycles used in the power block in addition to the efficiencies of the equipment such as the turbine and the heat exchangers.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, power conversion efficiency improvements are needed to reduce the costs of providing solar thermal power. Described herein are thermodynamic systems and methods that incorporate solar thermal energy. In some embodiments, the systems include multiple thermodynamic cycles and multiple energy sources so as to increase energy efficiency.

In the following disclosure, various embodiments are described. It is to be understood that those embodiments are example implementations of the disclosed inventions and that alternative embodiments are possible. All such embodiments are intended to fall within the scope of this disclosure.

Figure 1:
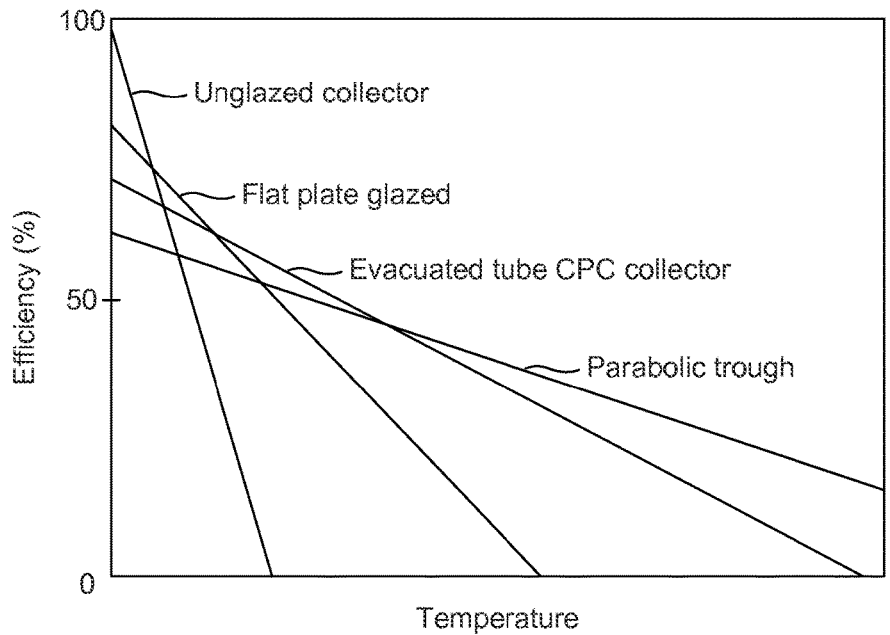
FIG. 1 is a graph that plots efficiency curves for various solar thermal collectors.

FIG. 1 is a graph that plots the efficiency curves for various solar thermal collectors. As is apparent from the figure, the solar thermal collector that provides the highest efficiency depends upon the temperature at which the collector operates. The highest efficiency of a solar thermal collector ranges from over 90% for an unglazed collector operating close to the ambient temperature to less than 50% for a concentrating collector operating at 300° C. to 500° C. or even higher. Concentrating solar power (CSP) plants are typically based on concentrating solar collectors operating at 250° C. to 1000° C. higher than the ambient. Normally, each such plant is based upon one specific type of collector (e.g., parabolic trough, parabolic dish, central receiver tower, etc.) coupled with one specific thermodynamic cycle (e.g., a steam Rankine cycle, organic Rankine cycle, Stirling cycle, Brayton cycle, super critical carbon dioxide cycle, etc.) matched for the temperature range of the collector.

Figure 2:
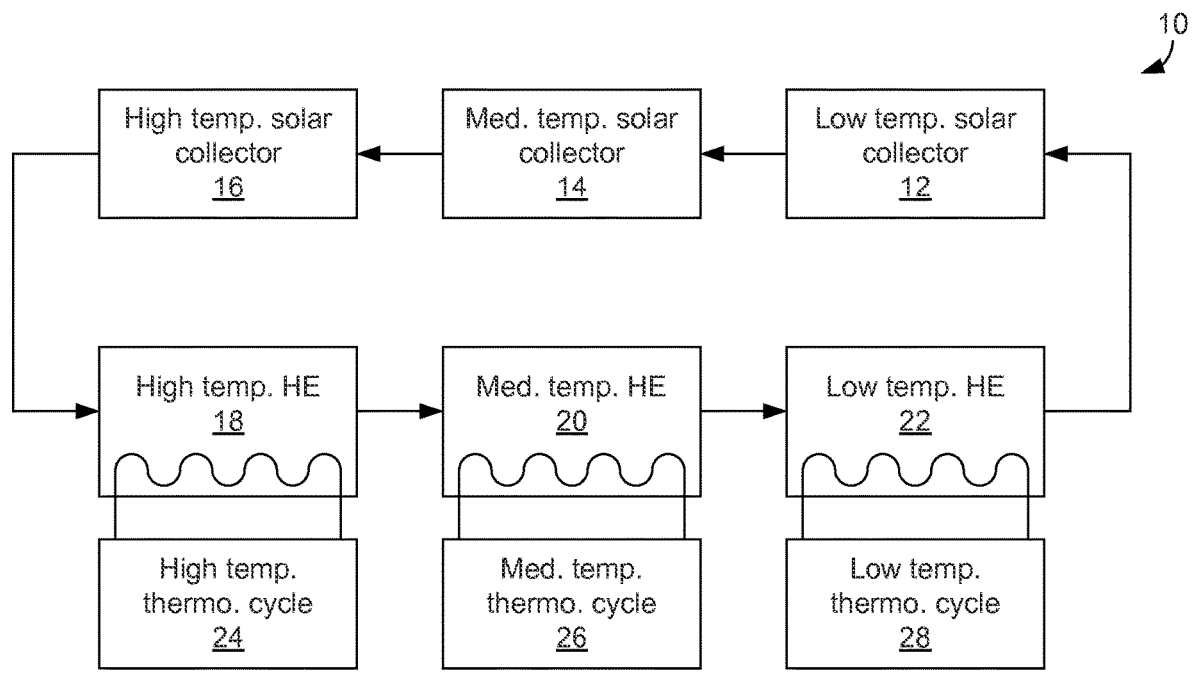
FIG. 2 is a schematic diagram of an embodiment of a thermodynamic system that includes multiple parallel thermodynamic cycles using heat from a collector fluid that is heated by multiple solar collectors at different temperatures.

A solar thermal plant that is based upon parabolic troughs typically uses solar collectors operating between about 300° C. and 400° C. coupled with a steam Rankine cycle. Heat from the collector fluid below 300° C. is typically not utilized because of the difficulty of operating a steam Rankine cycle at lower temperatures. As described herein, however, successively lower temperature thermodynamic cycles can be integrated into a system, each cycle operating in parallel and extracting heat from the lower temperature collector fluid exiting from the previous cycle with the final cycle operating at close to the ambient temperature. Such an innovation enables the use of lower temperature collectors to heat the collector fluid back to the highest temperature. For example, to heat the collector fluid from 50° C. to 400° C., the fluid can be heated from 50° C. to 90° C. in flat plate collectors at an efficiency of over 70%, from 100° C. to 200° C. in evacuated tube or reflector type collectors with an efficiency over 70%, and finally from 200° C. to 400° C. in parabolic trough collectors operating at an average efficiency of 55%, instead of all of the collector fluid being heated from 300° C. to 400° C. in parabolic trough collectors at an efficiency of 50%. This not only enables the extraction of more heat out of the collector fluid, but also enables one to capture solar heat at a higher overall efficiency. In order to do so, multiple thermodynamic cycles can be integrated into the system, each capable of using successively lower temperatures. For example, a steam Rankine cycle can be followed by an organic Rankine cycle, which can be followed by another organic Rankine cycle and/or an absorption refrigeration cycle. FIG. 2 illustrates an example of such a system.

In FIG. 2, a thermodynamic system 10 includes multiple solar collectors arranged in series that successively heat a collector fluid (e.g., oil) to higher and higher temperatures. In the embodiment of FIG. 2, the system 10 includes a low temperature solar collector 12, a medium temperature solar collector 14, and a high temperature solar collector 16. By way of example, the low temperature solar collector 12 can be a flat plate solar collector that heats the collector fluid to approximately 100° C., the medium temperature solar collector 14 can be an evacuated tube or reflector type collector that heats the collector fluid to approximately 200° C. or 250° C., and the high temperature solar collector 16 can be a parabolic trough collector that heats the collector fluid to approximately 400° C.

The collector fluid flows from the low temperature solar collector 12, to the medium temperature solar collector 14, to the high temperature solar collector 16, and then on to multiple heat exchangers. In the embodiment of FIG. 2, the heat exchangers include a high temperature heat exchanger 18, a medium temperature heat exchanger 20, and a low temperature heat exchanger 22. The collector fluid flows through each of the high, medium, and low temperature heat exchangers 18-22 in sequence and then returns to the low temperature solar collector 12 to continue the cycle. While passing through the heat exchangers 18-22, the heat from the collector fluid is used to drive multiple thermodynamic cycles.

In the embodiment of FIG. 2, the thermodynamic cycles include a high temperature thermodynamic cycle 24, a medium temperature thermodynamic cycle 26, and a low temperature thermodynamic cycle 28. By way of example, the high temperature thermodynamic cycle 24 can be a steam Rankine cycle that operates in a range of approximately 250° C. to 550° C., the medium temperature thermodynamic cycle 26 can be an organic Rankine cycle that operates in a range of approximately 150° C. to 250° C., and the low temperature thermodynamic cycle 28 can be a further organic Rankine cycle, an absorption/refrigeration cycle, or a Goswami cycle (i.e., power/refrigeration) that operates in a range of approximately 70° C. to 200° C.

Figure 3:
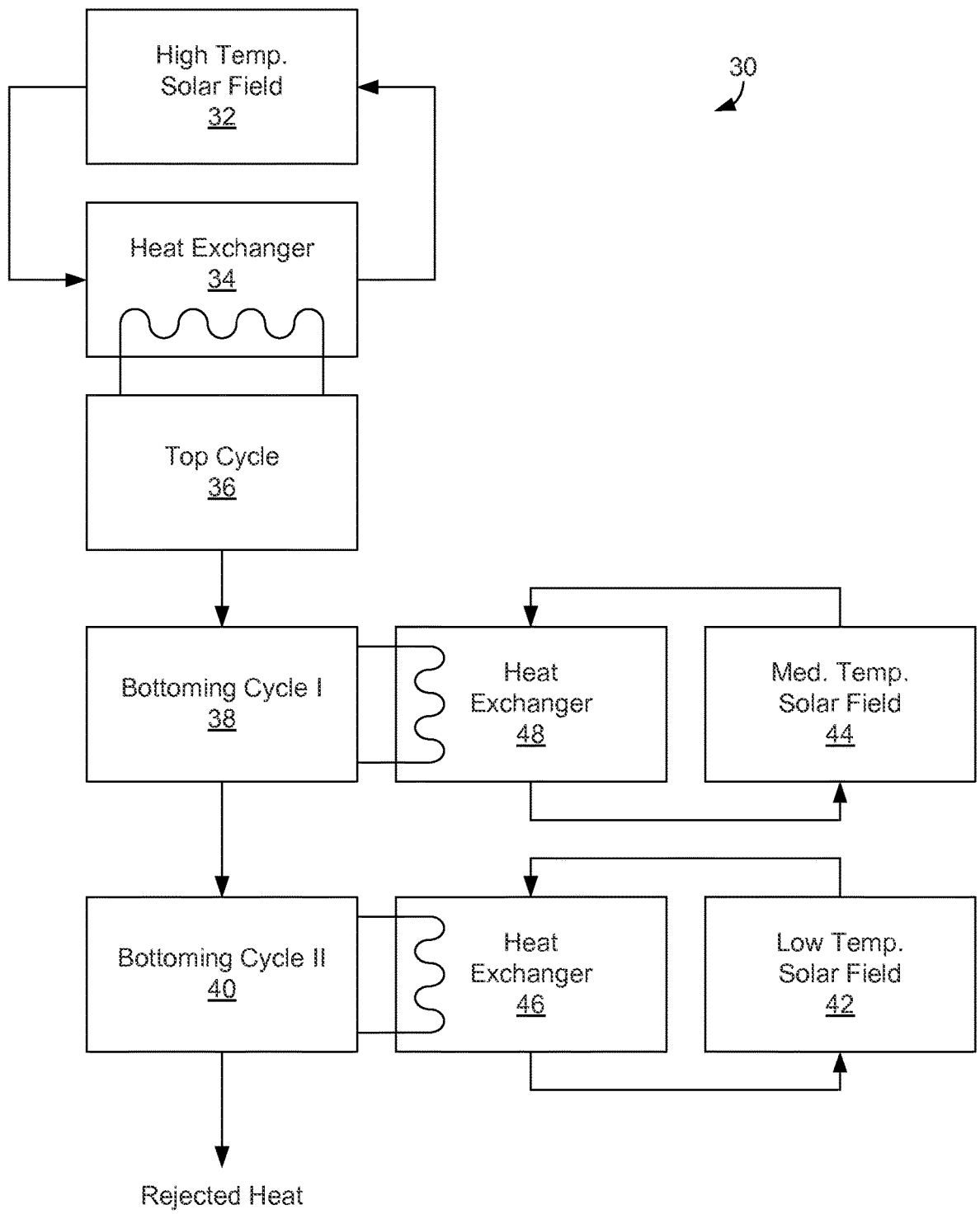
FIG. 3 is a schematic diagram of an embodiment of a thermodynamic system that includes a top cycle and two bottoming cycles, each cycle using heat from a different solar field.

In addition to parallel combination of thermodynamic cycles, a series of bottoming cycles can be used to maximize the output from the heat input to the system. An example of such a system 30 is shown in FIG. 3. The system 30 includes a high temperature solar field 32, which can comprise parabolic trough collectors that heat a collector fluid to a high temperature, such as approximately 500° C. The collector fluid is delivered to a heat exchanger 34 through which heat carried by the collector fluid is transferred to a top thermodynamic cycle 36. By way of example, the top thermodynamic cycle 36 comprises a steam Rankine cycle that operates in a range of approximately 400° C. to 500° C. The system 30 further includes a first bottoming cycle 38 that operates off of the waste of the top cycle 36. By way of example, the first bottoming cycle 38 comprises an organic Rankine cycle that operates in a range of approximately 120° C. to 250° C. In addition, the system 30 includes a second bottoming cycle 40 that operates off of the waste of the first bottoming cycle 38. By way of example, the second bottoming cycle 40 comprises a further organic Rankine cycle, an absorption/refrigeration cycle, or a Goswami cycle that operates in a range of approximately 70° C. to 120° C.

As is further shown in FIG. 3, the system 30 also includes a low temperature solar field 42 and a medium temperature solar field 44 that provide heat to the bottoming cycles. Collector fluid that circulates in the low temperature solar field 42 is heated and the heat carried by the collector fluid is provided to the second bottoming cycle 40, for example with a further heat exchanger 46. By way of example, the low temperature solar field 42 comprises flat plate collectors that heat the collector fluid to approximately 120° C. In similar manner, the medium temperature solar field 44 heats collector fluid and the heat carried by the fluid is provided to the first bottoming cycle 38, for example with a further heat exchanger 48. By way of example, the medium temperature solar field 44 comprises evacuated tube or reflector type collectors that heat the collector fluid to approximately 250° C. Therefore, the system 30 includes multiple solar fields that operate in parallel to provide additional energy to the thermodynamic cycles of the system.

In recent years there have been substantial improvements in thermodynamic cycles employing multi-component working fluids and a combination of heat exchange operations to reduce irreversible losses typical of conventional Rankine cycles. Generally these improved thermodynamic cycles can be used as bottoming cycles and can provide demonstrable and substantial improvements in overall thermodynamic system efficiency. At lower available temperatures, bottoming cycles can be of different types, such as the organic Rankine or Kalina cycles for the production of electric power, the Goswami cycle for the production of electric power as well as cooling and/or ice, and the absorption/refrigeration cycle for the production of refrigeration/ice. A bottoming cycle, such as the Kalina or the Goswami cycle, typically uses two interactive subsystems. The first involves a heat acquisition process for a multi-component working fluid. The second subsystem incorporates a distillation/condensation process. The efficiency improvement provided by the bottoming cycle is the result of the use of a multi-component working fluid mixture whose components have different boiling points at the same pressure. In the heat acquisition subsystem, the bottoming cycle closes the mismatch between the enthalpy-temperature characteristics of the heat source and working fluid, e.g., an ammonia/water mixture, as the fluid passes through the heat exchanger. The energy losses of a typical Rankine cycle power plant are reduced by the addition of the bottoming cycle, taking advantage of the changing temperature-enthalpy characteristics of the multi-component working fluid as it evaporates.

The quest for increased efficiencies, reduced costs, and mitigation of environmental concerns in electric power generation is a driving force for adding bottoming cycles, assisted by solar thermal energy, to a conventional power plant, such as a gas turbine power plant. Disclosed below are systems that combine a high temperature power cycle, such as a fossil fuel-based (gas turbine power system or a coal or oil fired system) system, a nuclear power cycle, or a concentrating solar power cycle, with a cascade of cycles that utilize the maximum possible amount of thermal energy of the original source including supplementary heat from a solar energy system and even ambient thermal energy to produce as output electrical power or a combination of electrical power and refrigeration outputs. The cascade of bottoming cycles can comprise one or more Rankine cycles using steam, organic fluids, or other fluids, a Kalina cycle, a Goswami cycle based on a variety of combinations of working fluids and/or an absorption/refrigeration cycle in order to improve the overall power output, and other outputs such as cooling/refrigeration/ice and low quality heat. The thermal energy needed to drive the system can come from the heat rejected from a top cycle and/or from a solar thermal plant, such as a concentrating solar thermal plant, an evacuated tube, or a flat plate solar thermal plant. A concentrating solar thermal collector system, such as a central receiver system, can provide the needed thermal energy to the topping cycle or independently drive the bottoming cycles. A combination of different types of solar collectors can be used at different points in the cycle or cycles to give the maximum efficiency of solar collection.

Figure 4:
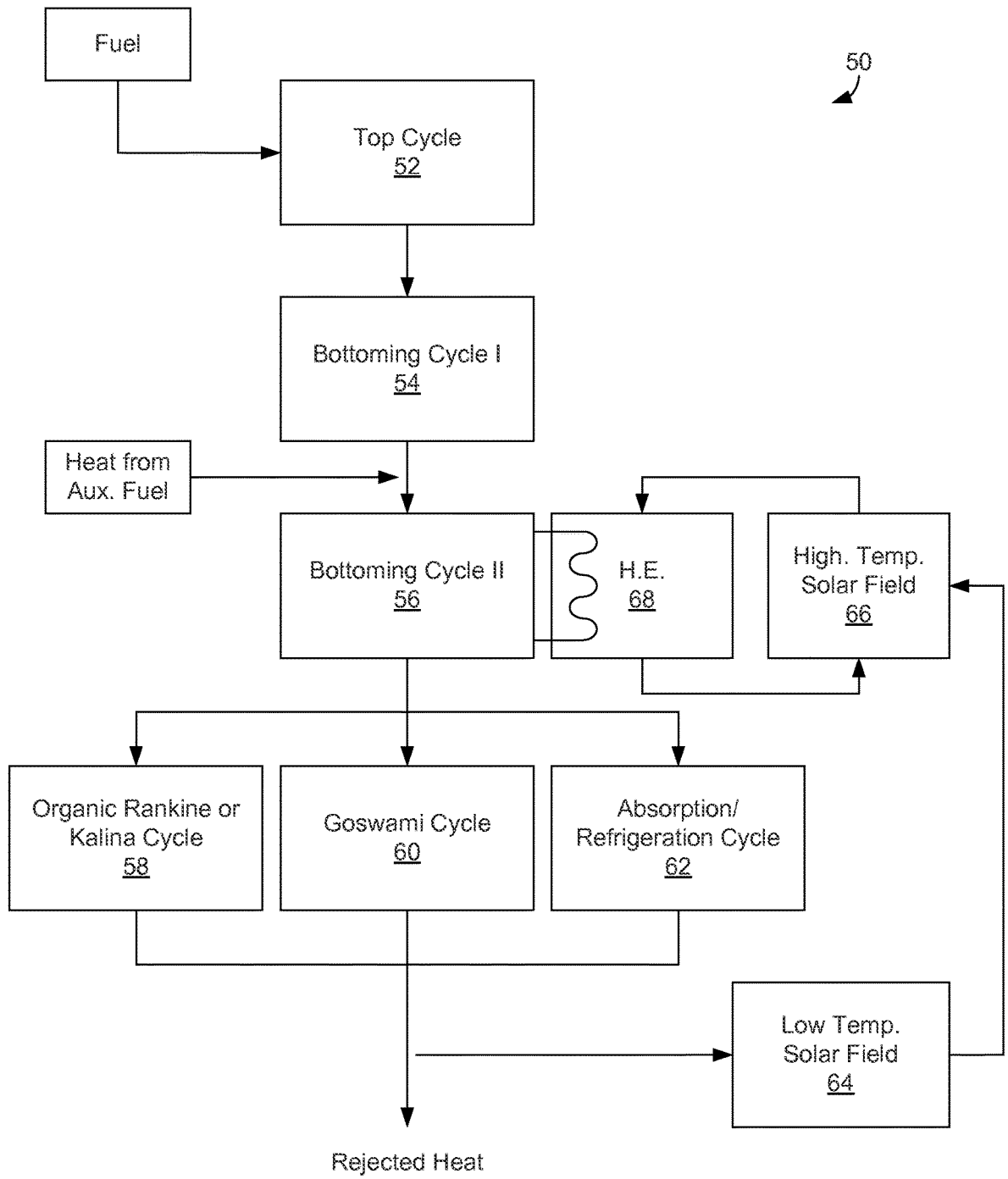
FIG. 4 is a schematic diagram of an embodiment of a thermodynamic system that includes a top cycle, multiple bottoming cycles, and multiple solar fields providing thermal energy to the system.

FIG. 4 illustrates an example of a system 50 of the type described above. The system 50 comprises a high temperature top cycle 52 that generates power at an efficiency of $\eta_1$. By way of example, the top cycle 52 comprises a gas turbine plant, coal plant, or a nuclear power plant that operates at a range of approximately 700° C. to 1000° C. The waste from the top cycle 52 feeds a first bottoming cycle 54 that operates at an efficiency of $\eta_2$. By way of example, the first bottoming cycle 54 comprises a Rankine cycle that operates at a range of approximately 400° C. to 550° C. The waste from the first bottoming cycle 54 feeds a second bottoming cycle 56 that operates at an efficiency of $\eta_3$. By way of example, the second bottoming cycle 56 comprises a Rankine cycle that operates at a range of approximately 250° C. to 400° C.

In addition to the first and second bottoming cycles 54 and 56, the system 50 includes one or more further bottoming cycles that is/are fed by the waste from the second bottoming cycle. If two or more further bottoming cycles are used, they can be said to operate in parallel (whereas the first and second bottoming cycles 54 and 56 operate in series). As shown in FIG. 4, these further bottoming cycles can include one or more of an organic Rankine cycle or Kalina cycle 58, a Goswami cycle 60, and an absorption refrigeration cycle 62, each of which operates at an efficiency of $\eta_4$ and a range of approximately 100° C. to 200° C.

The system 50 additionally includes a low temperature solar field 64, which can comprise an evacuated tube solar thermal plant, a flat plate solar thermal plant, or a concentrator solar thermal plant. By way of example, the low temperature solar field 64 heats the collector fluid to approximately 200° C. The low temperature solar field 64 provides the heated collector fluid to a high temperature solar field 66, which can comprise a concentrator solar thermal plant, which further heats the collector fluid to approximately 400° C. That heat is provided back to the system to the second bottoming cycle 56 using a heat exchanger 68. Notably, the heat could instead be provided to the top cycle 52 or the first bottoming cycle 54 depending upon the temperature of the collector fluid that leaves the high temperature solar field 66.

For the system 50 shown in FIG. 4, the overall efficiency of the system (assuming there is no additional heat input after the topping cycle) would be:

$$\eta_{system} = (\eta_1+\eta_2+\eta_3+\eta_4) - (\eta_1\eta_2+\eta_1\eta_3+\eta_2\eta_3+\eta_1\eta_4+\eta_2\eta_4+\eta_3\eta_4) + (\eta_1\eta_2\eta_3+\eta_1\eta_2\eta_4+\eta_1\eta_3\eta_4+\eta_2\eta_3\eta_4) - (\eta_1\times\eta_2\times\eta_3\times\eta_4).$$

Assuming efficiencies of $\eta_1=25\%$ for a gas turbine, $\eta_2=25\%$ for a first Rankine cycle, $\eta_3=20\%$ for a second Rankine cycle, and $\eta_4=15\%$ for the further bottoming cycle, the overall system efficiency would be:

$$\begin{aligned}\eta_{system} = &(0.25+0.25+0.20+0.15) - \\ &((0.25\times0.25)+(0.25\times0.20)+(0.25\times0.20)+\\ &(0.25\times0.15)+(0.25\times0.15)+(0.2\times0.15))+\\ &((0.25\times0.25\times0.20)+(0.25\times0.25\times0.15)+\\ &(0.25\times0.20\times0.15)+(0.25\times0.20\times0.15))-\\ &(0.25\times0.25\times0.20\times0.15)\\ =&\ 0.85-0.2675+0.0369-0.0019\\ =&\ 0.6175\text{ or }61.75\%\end{aligned}$$

If a cascading thermodynamic cycle arrangement results in a power block efficiency of a CSP plant of 50% (up from the present single cycle power block efficiency of about 35%) and the cascading solar collector system provides an average efficiency of 55% (as opposed to the present parabolic trough system average efficiency of 50%), the overall efficiency of the complete CSP plant will be 27.5%, as opposed to the present overall efficiency of about 17%.

Figure 5:
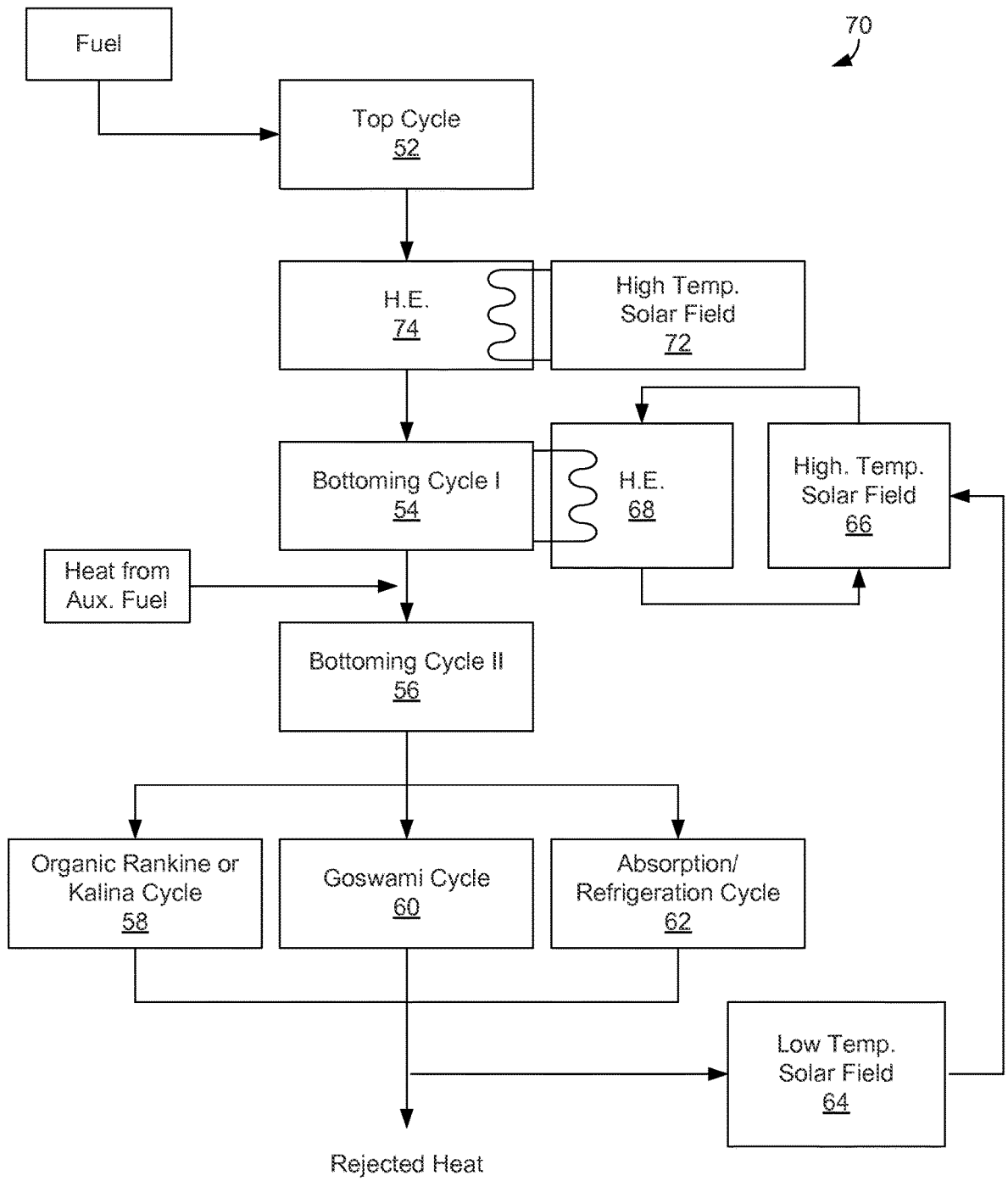
FIG. 5 is a schematic diagram of a further embodiment of a thermodynamic system that includes a top cycle, multiple bottoming cycles, and multiple solar fields providing thermal energy to the system.

FIG. 5 illustrates a further system 70 that shares many similarities with the system 50 shown in FIG. 4. In the system 70, however, the high temperature solar field 66 provides thermal energy to the first bottoming cycle 54 and a second high temperature solar field 72 (e.g., concentrator solar thermal power plant) is provided that heats the waste of the top cycle 52 with a heat exchanger 74 before the waste is provided to the first bottoming cycle 54.

The invention claimed is:

1. A solar thermal power system comprising:
   multiple thermodynamic systems that operate different types of thermodynamic cycles at different temperature ranges; and
   multiple solar thermal plants that provide thermal energy to the thermodynamic systems, wherein the solar thermal plants are of different types and operate at different temperature ranges, the solar thermal plants being connected in series such that they each operate using the same solar collector fluid that is sequentially cycled through each plant in series.

2. The solar thermal power system of claim 1, wherein the thermodynamic systems operate simultaneously but are independent of each other so waste from one thermodynamic system does not drive another thermodynamic system.

3. The solar thermal power system of claim 1, wherein the solar thermal power system comprises three thermodynamic systems that operate three different thermodynamic cycles, the thermodynamic cycles including (i) a high temperature steam Rankine cycle, (ii) a medium temperature organic Rankine cycle, and (iii) a low temperature organic Rankine cycle, an absorption/refrigeration cycle, or a power/refrigeration cycle.

4. The solar thermal power system of claim 1, further comprising a separate heat exchanger for each thermodynamic system, the heat exchangers being arranged in series such that the solar collector fluid is sequentially cycled through each heat exchanger in series.

5. The solar thermal power system of claim 1, wherein solar thermal power system comprises three solar thermal plants including (i) a flat plate collector plant, (ii) an evacuation tube collector plant or a reflector type collector plant, and (iii) a parabolic trough collector plant.

6. A thermodynamic solar thermal power system comprising:
   multiple thermodynamic systems that operate different types of thermodynamic cycles at different temperature ranges, the thermodynamic systems being connected in series such that each thermodynamic system receives waste from another thermodynamic system and is driven by that waste, provides waste to another thermodynamic system that drives that thermodynamic system, or both; and
   multiple solar thermal plants of different types that provide thermal energy to the thermodynamic systems, wherein at least two of the solar thermal plants operate at different temperature ranges and are connected in series such that they operate using the same solar collector fluid that is sequentially cycled through the plants in series.

7. The solar thermal power system of claim 6, wherein the thermodynamic systems include a top thermodynamic system that operates a top cycle at a high temperature, a first bottoming thermodynamic system connected to the top thermodynamic system that operates a first bottoming cycle at a medium temperature, and a second bottoming thermodynamic system connected to the first bottoming thermodynamic system that operates second bottoming cycle at a low temperature.

8. The solar thermal power system of claim 7, wherein the top thermodynamic system comprises a gas turbine plant, a coal plant, or a nuclear power plant, and the first and second bottoming cycles comprise Rankine cycles.

9. The solar thermal power system of claim 7, wherein the solar thermal plants include a low temperature solar plant and a high temperature solar plant, wherein the low temperature solar plant heats the solar collector fluid to a first temperature and the high temperature solar plant further heats the collector fluid to a second higher temperature, the heat within the solar collector fluid then being provided to the second bottoming thermodynamic system.

10. The solar thermal power system of claim 7, wherein the solar thermal plants include a low temperature solar plant and a high temperature solar plant, wherein the low temperature solar plant heats the solar collector fluid to a first temperature and the high temperature solar plant further heats the collector fluid to a second higher temperature, the heat within the solar collector fluid then being provided to the first bottoming thermodynamic system.

11. The solar thermal power system of claim 10, further comprising a second high temperature solar plant that provides heat to waste from the top thermodynamic system before the waste is provided to the first bottoming thermodynamic system.

12. The solar thermal power system of claim 7, further comprising a third bottoming thermodynamic system that operates a third bottoming cycle, the third bottoming thermodynamic system being connected in series with the second bottoming thermodynamic system, the third bottoming cycle comprising an organic Rankine cycle, a Kalina cycle, a Goswami cycle, or an absorption/refrigeration cycle.

* * * * *